(12) United States Patent
Sybert et al.

(10) Patent No.: US 8,393,631 B1
(45) Date of Patent: Mar. 12, 2013

(54) AUTOMATIC ENGAGING AND DISENGAGING HITCH ASSEMBLY

(75) Inventors: Steven S. Sybert, Columbus Grove, OH (US); Donald J. Schmidt, Columbus Grove, OH (US)

(73) Assignee: Ergotech, LLC, Vaughnsville, OH (US)

( * ) Notice: Subject to any disclaimer, the term of this patent is extended or adjusted under 35 U.S.C. 154(b) by 81 days.

(21) Appl. No.: 13/050,008

(22) Filed: Mar. 17, 2011

Related U.S. Application Data

(60) Provisional application No. 61/314,615, filed on Mar. 17, 2010.

(51) Int. Cl.
*B60D 1/04* (2006.01)

(52) U.S. Cl. .................. 280/508; 280/509; 280/510

(58) Field of Classification Search .................. 280/508, 280/509, 510
See application file for complete search history.

(56) References Cited

U.S. PATENT DOCUMENTS

| | | | |
|---|---|---|---|
| 2,636,744 A | 4/1953 | Trees | |
| 2,812,195 A * | 11/1957 | Kelley | 280/510 |
| 3,565,459 A | 2/1971 | Reid | |
| 4,258,930 A | 3/1981 | Hess | |
| 5,031,927 A * | 7/1991 | Frenette | 280/481 |
| 5,183,284 A | 2/1993 | Paplinski | |
| 6,467,793 B2 * | 10/2002 | Putnam | 280/508 |
| 6,908,093 B1 | 6/2005 | Putnam | |
| 6,973,976 B1 | 12/2005 | Turgeon | |

* cited by examiner

*Primary Examiner* — Tashiana Adams
*Assistant Examiner* — Marlon Arce
(74) *Attorney, Agent, or Firm* — MacMillan, Sobanski & Todd, LLC

(57) ABSTRACT

A hitch assembly is provided that includes a body and a latch member that is movable relative to the body between an open position and a closed position for securing a hitch pin to the body. A locking pin is movable between a disengaged position and an engaged position for retaining the latch member in the closed position. An unlocking member is mounted to the latch member for movement between a retracted position and an extending position for preventing the locking pin from moving from the disengaged position to the engaged position.

20 Claims, 8 Drawing Sheets

AUTOMATIC ENGAGING AND DISENGAGING HITCH ASSEMBLY

CROSS-REFERENCE TO RELATED APPLICATIONS

This application claims the benefit of U.S. Provisional Application No. 61/314,615, filed Mar. 17, 2010, the disclosure of which is incorporated herein by reference.

BACKGROUND OF THE INVENTION

This invention relates in general to hitch assemblies, such as can be used for coupling a towing vehicle and a towed vehicle. In particular, this invention relates to an automatic engaging and disengaging hitch assembly.

Hitch assemblies are known devices that can be used for coupling a towing vehicle and a towed vehicle. In general, a hitch assembly is typically mounted to the towing vehicle and adapted to engage and disengage a hitch pin, which is provided on the towed vehicle. For example, a known hitch assembly includes a housing that defines an open ended slot adapted to align and receive the hitch pin therein. The hitch assembly further includes a latch member that is pivotally mounted to the housing so as to engage and disengage the hitch pin.

Other known hitch assemblies are configured to automatically engage the hitch pin. To accomplish this, the latch member is initially biased in a closed position. When the hitch assembly is brought into contact with the hitch pin, the hitch pin exerts a force on a cam surface of the latch member. The cam surface is configured to pivot the latch member from the closed position to an open position thereby allowing the hitch pin to be received within the slot. Once the hitch pin is fully received within the slot, the latch member returns to the closed position for securing the hitch pin within the hitch assembly. To disengage the hitch assembly, however, the latch member must be manually rotated to the open position while the hitch pin is simultaneously removed from the hitch assembly.

It is also known to provide hitch assemblies with an automatic locking mechanism for locking the latch member in the closed position. For example, a known locking mechanism includes a spring-loaded locking pin that is configured to automatically engage the latch member and prevent rotation thereof when the latch member reaches the closed position. To disengage the hitch assembly, however, the locking pin needs to be manually released from the latch member while the hitch pin is simultaneously removed from the hitch assembly. To overcome this, it is also known to provide such hitch assemblies with an unlocking mechanism that is adapted to prevent engagement of the locking pin with the latch member until the hitch pin has been removed from the hitch assembly. However, known locking mechanisms need to be actuated before disengaging the hitch assembly and also before engaging the hitch assembly.

Although known hitch assemblies function in an acceptable manner, it is desirable to provide an automatic engaging and disengaging hitch assembly.

SUMMARY OF THE INVENTION

This invention relates in general to a hitch assembly such as can be used for coupling a towing vehicle and a towed vehicle. The hitch assembly includes a body and a latch member that is movable relative to the body between an open position and a closed position for securing a hitch pin to the body. A locking pin is movable between a disengaged position and an engaged position for retaining the latch member in the closed position. An unlocking member is mounted to the latch member for movement between a retracted position and an extending position for preventing the locking pin from moving from the disengaged position to the engaged position.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
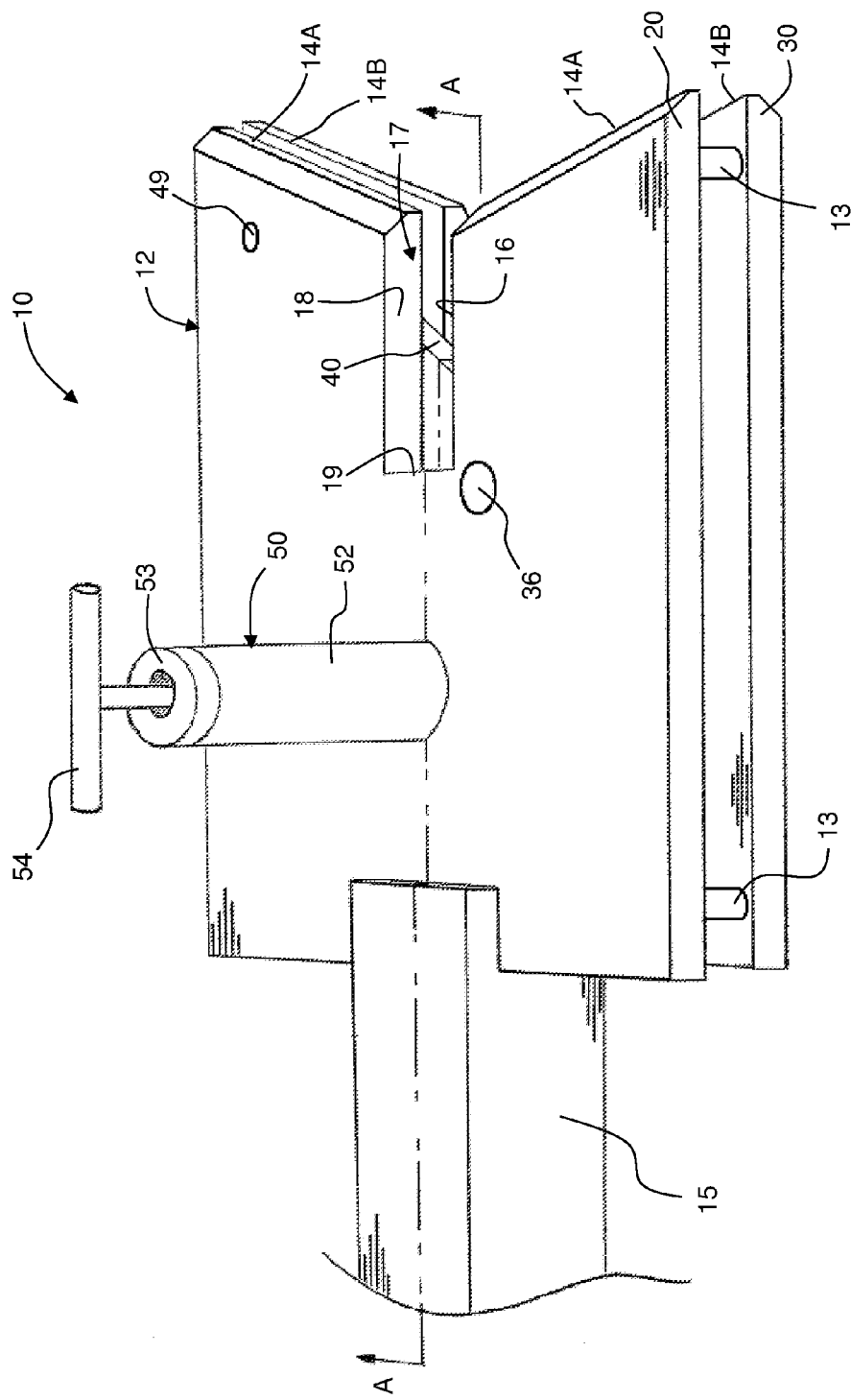
FIG. 1 is a perspective view of a hitch assembly in accordance with this invention.

Referring now to the drawings, there is illustrated in FIG. 1 a hitch assembly, indicated generally at 10, in accordance with this invention. The hitch assembly 10 can be used as a coupling device for connecting a towing vehicle (not shown) and a towed vehicle (also not shown). Although the hitch assembly 10 will be described and illustrated in the context of coupling a towing vehicle and a towed vehicle, it should be fully appreciated that this invention may be used in any desired environment and for any desired purpose.

The illustrated hitch assembly 10 includes a housing 12 that is configured to align and receive a vertically extending hitch pin HP (shown in FIGS. 5 through 7) provided on the towed vehicle. Thus, the housing 12 can define a generally horizontal structure having a first member 20 and a second member 30 that defines a body of the hitch assembly 10. As shown, the first and second members 20, 30 are generally flat components that are mounted parallel with one another. The first and second members 20, 30 may be spaced apart so as to form a gap therebetween. For example, the illustrated housing 12 includes a plurality of spacers 13 that are located intermediate the first and second members 20, 30. The spacers 13 can be separate components that are secured to the first and second members 20, 30 or may be formed from material deposited by a welding process. Alternatively, the first and second members 20, 30 of the housing 12 may be integrally formed from a single piece of material using any suitable forming process.

The illustrated housing 12 defines a slot 17 that is adapted to receive and support the hitch pin HP within the hitch assembly 10. The slot 17 is defined by a pair of laterally opposing surfaces 16, 18 that longitudinally extend along a centerline CL (see FIGS. 5 through 7). As shown in FIG. 1, the slot 17 provides an open end and a closed end that is defined by a back wall 19. The illustrated housing 12 also includes a plurality of alignment surfaces 14A and 14B defined by the respective first and second members 20, 30 that are configured to align the hitch pin HP for receipt within the slot 17, although such is not required. The alignment surfaces 14A, 14B are angled relative to one another to form a V-shaped configuration. It should be appreciated that the housing 12 is not limited to the illustrated embodiment, but may be adapted for a desired application.

As shown, the housing 12 includes a mounting section 15 for attaching the hitch assembly 10 to the towing vehicle, although such is not required. The mounting section 15 can be secured to the housing 12 using any suitable method, including but not limited to a welding process or a plurality of fasteners (not shown). Alternatively, the mounting section 15 can be integrally formed with the housing 12 if so desired. It should also be appreciated that the mounting section 15 may be adapted to fit a wide range of draw bars or other mounting devices (not shown) for attaching the hitch assembly 10 to the towing vehicle.

The hitch assembly 10 also includes a latch member 40 that is configured to secure the hitch pin HP within the slot 17. To accomplish this, the latch member 40 is pivotally mounted between the first and second members 20, 30 of the housing 12 by a pivot pin 36. As will become apparent, the latch member 40 is rotatable between an open position and a closed position. The latch member 40 and its functions will be further described and illustrated below.

The hitch assembly 10 also includes a locking mechanism, indicated generally at 50. As shown, the locking mechanism 50 is mounted to a top surface of the first member 20. The locking mechanism 50 includes an enclosure 52 for housing internal components thereof, which will be described and illustrated below. The enclosure 52 can define a generally cylindrical structure that is attached to the housing 12 using any method, such as for example a welding process or a threaded connection. The illustrated locking mechanism 50 also includes a end cap 53. The end cap 53 may be removably secured to an end portion of the enclosure 52 by a threaded connection or the like to allow access to an internal components of the locking mechanism 50. It should be appreciated, however, that the enclosure 52 and the end cap 53 is not limited to the illustrated embodiment, but may define any shape or configuration for a desired application.

The locking mechanism 50 may also include a release handle 54 that is configured to assist in unlocking the hitch assembly 10. As illustrated, the handle 54 includes a shaft portion that extends into the enclosure 52 and protrudes from the end cap 53. A handle portion is integrally formed from or otherwise attached to the shaft portion. The handle portion may define any structure that enables an operator to grasp and apply a pulling force to the release handle 54. For example, the release handle 54 may define a crossbar or a ring-like structure. In other non-illustrated embodiments, the release handle 54 may be embodied as a cable or tether having a hoop attached thereto.

Figure 2:
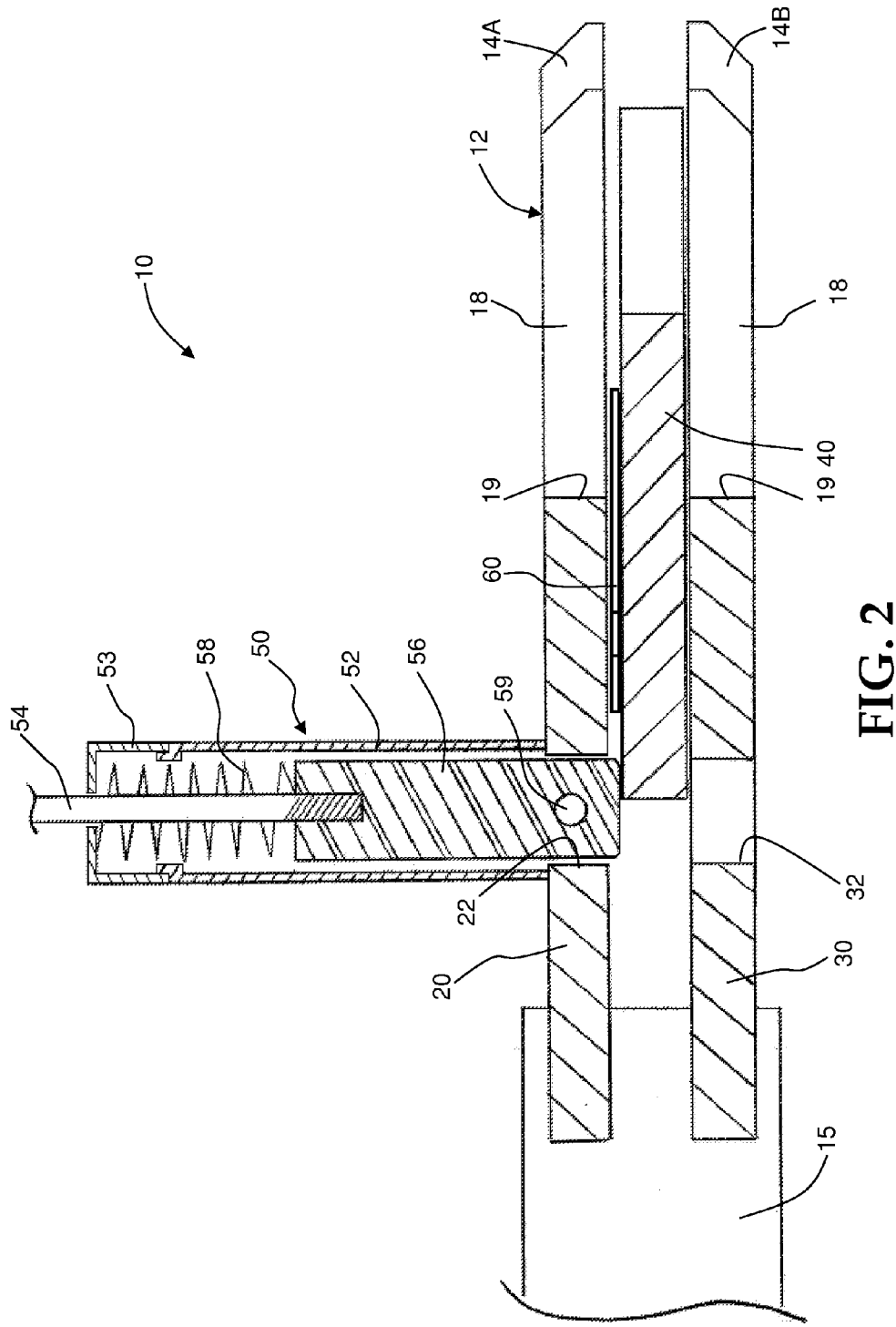
FIG. 2 is a cross-sectional side view of the hitch assembly taken along section line A-A in FIG. 1, which illustrates the hitch assembly in an open position.
Figure 3:
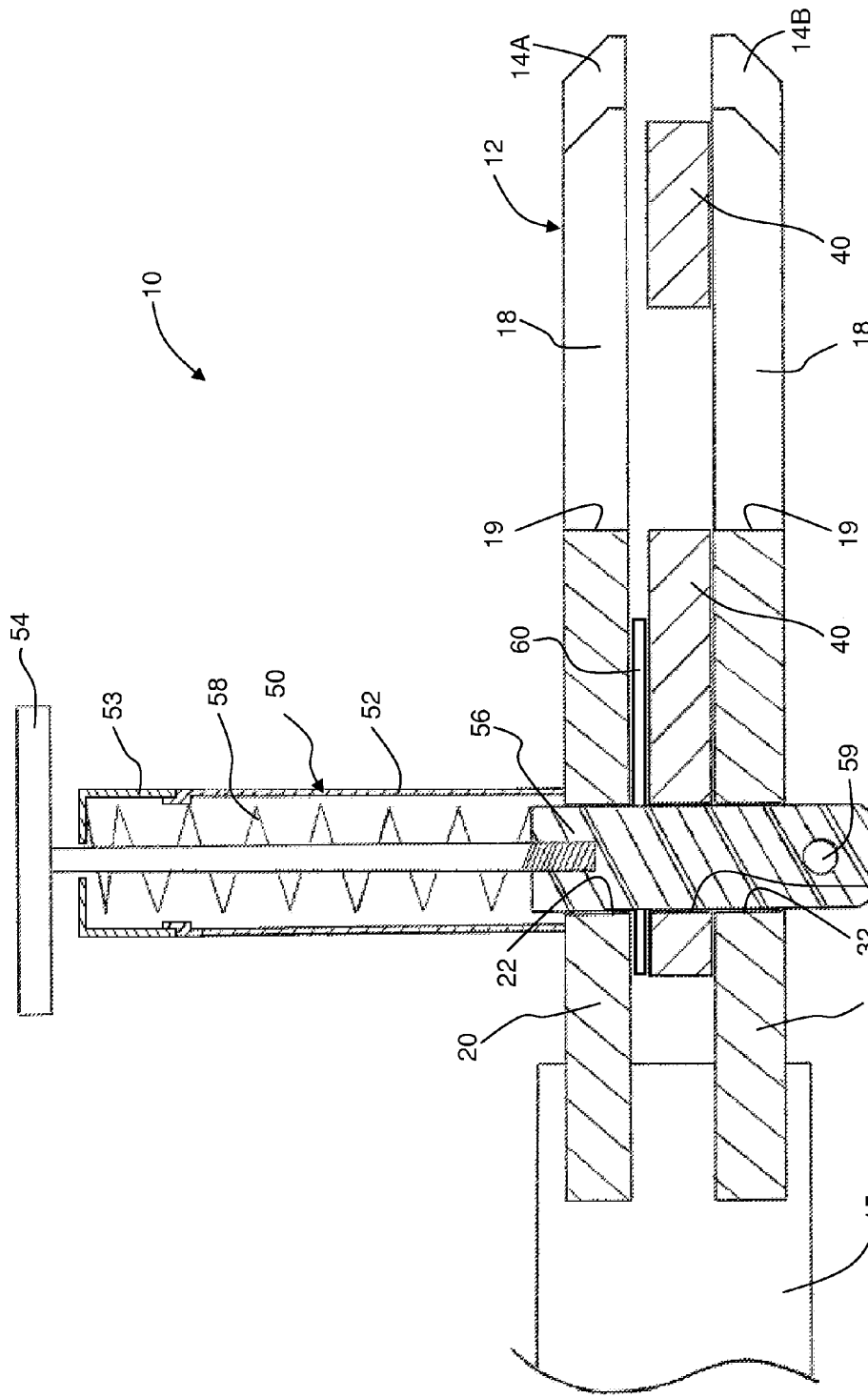
FIG. 3 is a cross-sectional side view of the hitch assembly taken along section line A-A in FIG. 1, which illustrates the hitch assembly in a closed and locked position.
Figure 4:
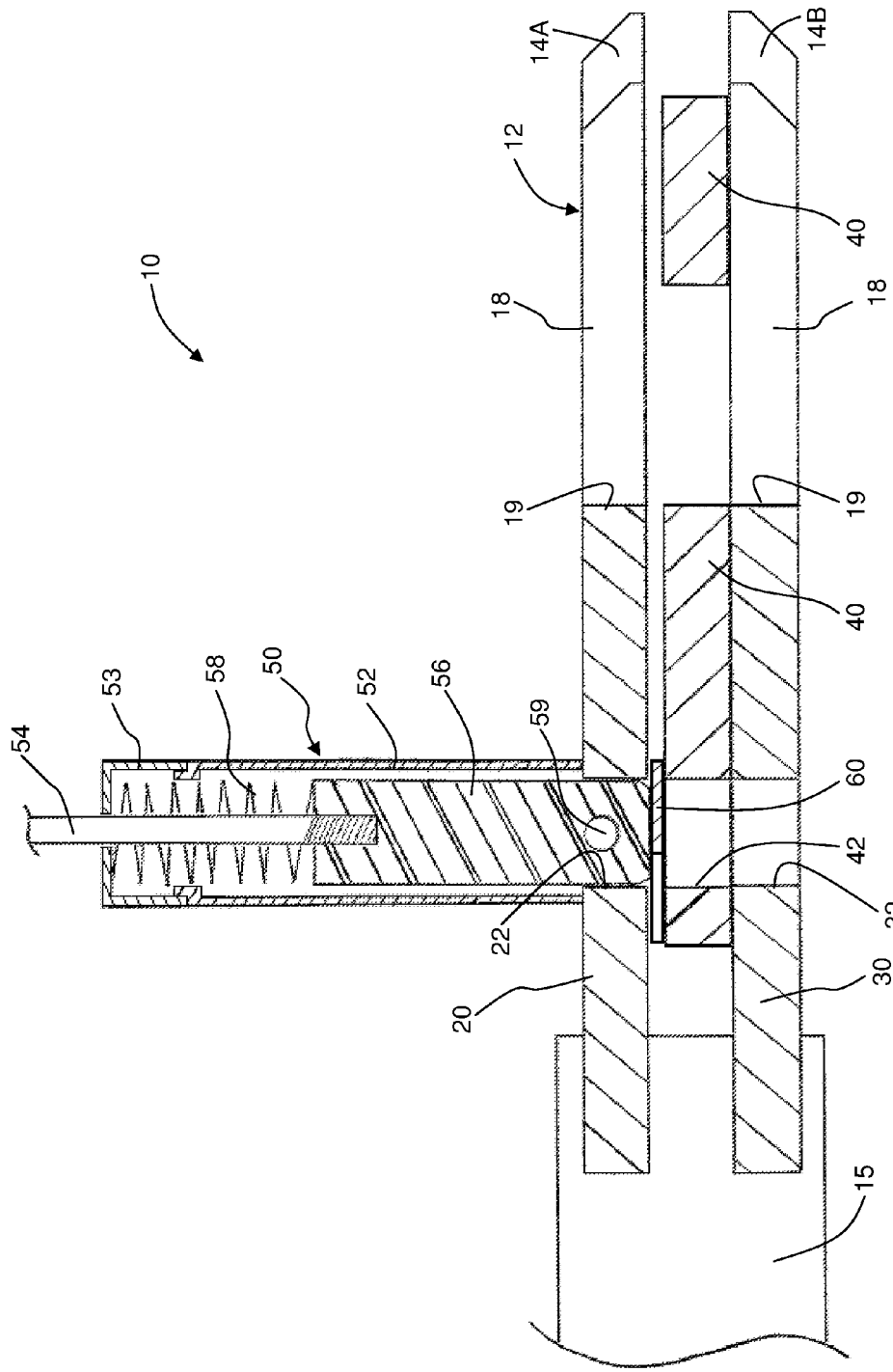
FIG. 4 is a cross-sectional side view of the hitch assembly taken along section line A-A in FIG. 1, which illustrates the hitch assembly in a closed and unlocked position.

Referring now to FIGS. 2 through 4, cross-sectional side views of the hitch assembly 10 taken along section line A-A of FIG. 1 are provided. Thus, internal components of the hitch assembly 10 that are not shown in FIG. 1 will now be described with reference to these figures. However, operation of the hitch assembly 10 will be explained further below after all of the components of the hitch assembly 10 have been discussed.

As shown in the figures, the first member 20 of the housing 12 defines an aperture 22. Similarly, the second member 30 of the housing 12 also defines an aperture 32. The respective apertures 22, 32 are axially aligned with one another and fully extend through the first and second members 20, 30. Although, it should be appreciated that the apertures 22, 32 can be alternatively configured for a desired purpose. For example, the aperture 32 need not fully extend through the second member 30.

As briefly explained above, the locking mechanism 50 is configured to lock or otherwise secure the latch member 40 in the closed position. To accomplish this, the illustrated locking mechanism 50 includes a locking pin 56 that is configured to extend through the aperture 22 and engage the latch member 40. As such, the locking mechanism 50 is mounted to the housing 12 such that the locking pin 56 is in axial alignment with the apertures 22, 32 of the first and second members 20, 30. The illustrated locking pin 56 is a generally round, elongated component formed from a substantially rigid material. The locking pin 56 is not, however, limited to the illustrated embodiment but may define any suitable structure for a desired application.

The locking pin 56 is mounted within the enclosure 52 for movement relative to the latch member 40. As shown, the locking pin 56 is biased in a downward direction, respectively, by a first biasing element 58 for insertion within the aperture 22 and engagement with the latch member 40. The first biasing element 58 can be a compression spring positioned between an inner surface of the end cap 53 and a top surface of the locking pin 56. Alternatively, the locking pin 56 may be biased for engagement with the latch member 40 in any suitable manner.

The handle 54 is attached to the locking pin 56. As will be further explained below, this configuration enables an operator to release the locking pin 56 from the latch member 40 so as to disengage the hitch assembly 10. The handle 54 is attached to the locking pin 56 by a threaded connection, although any connection is acceptable.

The illustrated locking pin 56 also defines a retaining aperture 59 for manually securing the locking pin 56 in a locked position, although such is not required. As shown, the retaining aperture 59 is a bore that extends through the locking pin 56 and is adapted to receive a pin or the like (not shown). It should be appreciated that the retaining aperture 59 can be configured in any manner for securing the locking pin 56 in a locked position. For example, the locking pin 56 may alternatively include a threaded portion or a groove for receiving a desired fastener.

In the illustrated embodiment, the latch member 40 is pivotally mounted within the housing 12 and positioned intermediate the first and second members 20, 30. The latch member 40 defines a flat, plate-like component, although such is not required. The latch member 40 may further include an aperture 42 (shown in FIGS. 3 and 4) that is configured to receive the locking pin 56 for locking the latch member 40 in the closed position. As shown, the aperture 42 is a bore that fully extends through the latch member 40. It should be appreciated that the aperture 42 may define any edge for the locking pin 56 to engage and prevent rotation of the latch member 40. Further, the aperture 42 need not fully extend through the latch member 40. The location of the aperture 42 on the latch member 40 will be described and illustrated below.

The illustrated hitch assembly 10 also includes an unlocking member 60 mounted to the latch member 40. The unlocking member 60 is configured to prevent the locking pin 56 from engaging the latch member 40 in the closed position after the locking pin 56 has been disengaged from the latch member 40. As best shown in FIG. 8, the unlocking member 60 includes a mounting pin 62, an extending portion 64, and a tab 66. The mounting pin 62 is configured to pivotally mount the unlocking member 60 to the latch member 40 for movement between an extended position and a retracted position relative to the aperture 42. Alternatively, the unlocking member 60 can be mounted to the latch member 40 for linear or reciprocal movement if so desired. The extending portion 64 is configured to extend along a top surface of the latch member 40 and is biased to extend over the aperture 42 of the latch member 40, the purpose of which will be explained below. The illustrated extending portion 64 defines a generally flat cross-sectional shape, although such a shape is not required. The tab 66 is optional and extends generally perpendicular to the extending portion 64. The tab 66 is adapted to contact an edge of the latch member 40 for limiting pivotal movement of the unlocking member 60. The tab 66 may also define an aperture 68 that is configured to attach a spring member (shown in FIGS. 5 through 7) to the unlocking member 60 for biasing the unlocking member 60 in the extended position. It should be appreciated that the unlocking member 60 can be configured in any suitable manner for a desired purpose.

Figure 5:
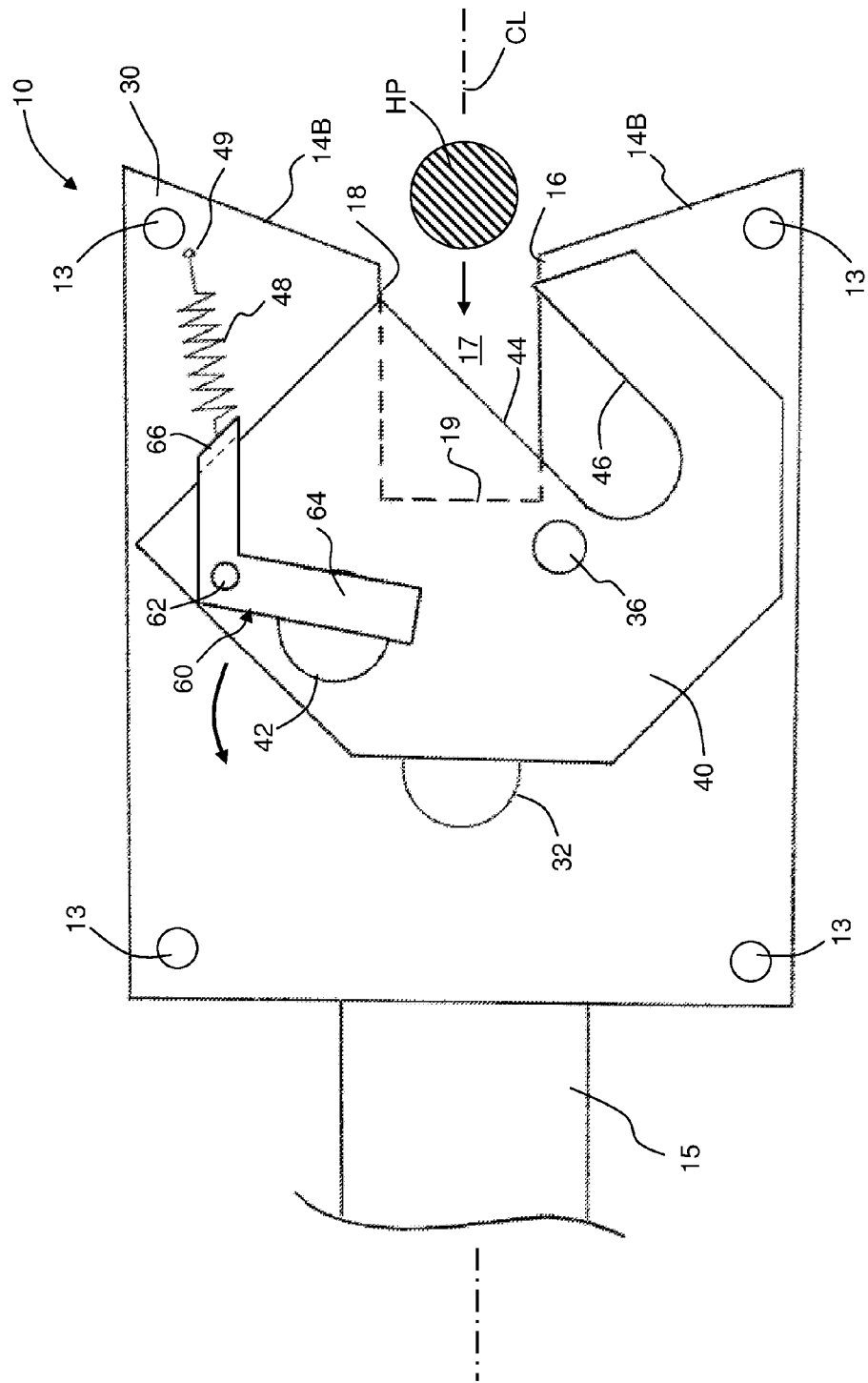
FIG. 5 is a top view of the hitch assembly illustrated in the open position as shown in FIG. 2 with an upper body member removed.
Figure 6:
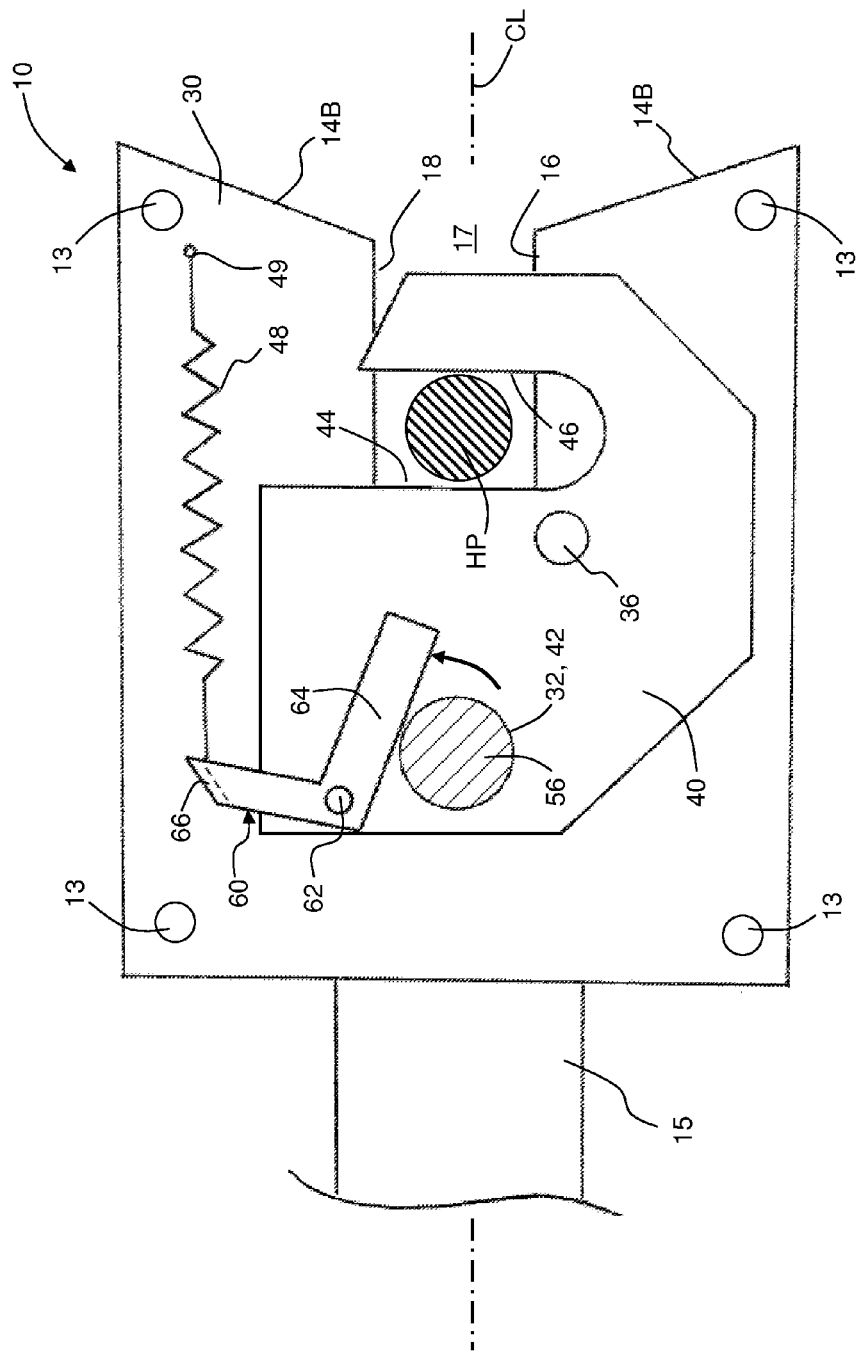
FIG. 6 is a top view of the hitch assembly illustrated in the closed and locked position as shown in FIG. 3 with the upper body member removed.
Figure 7:
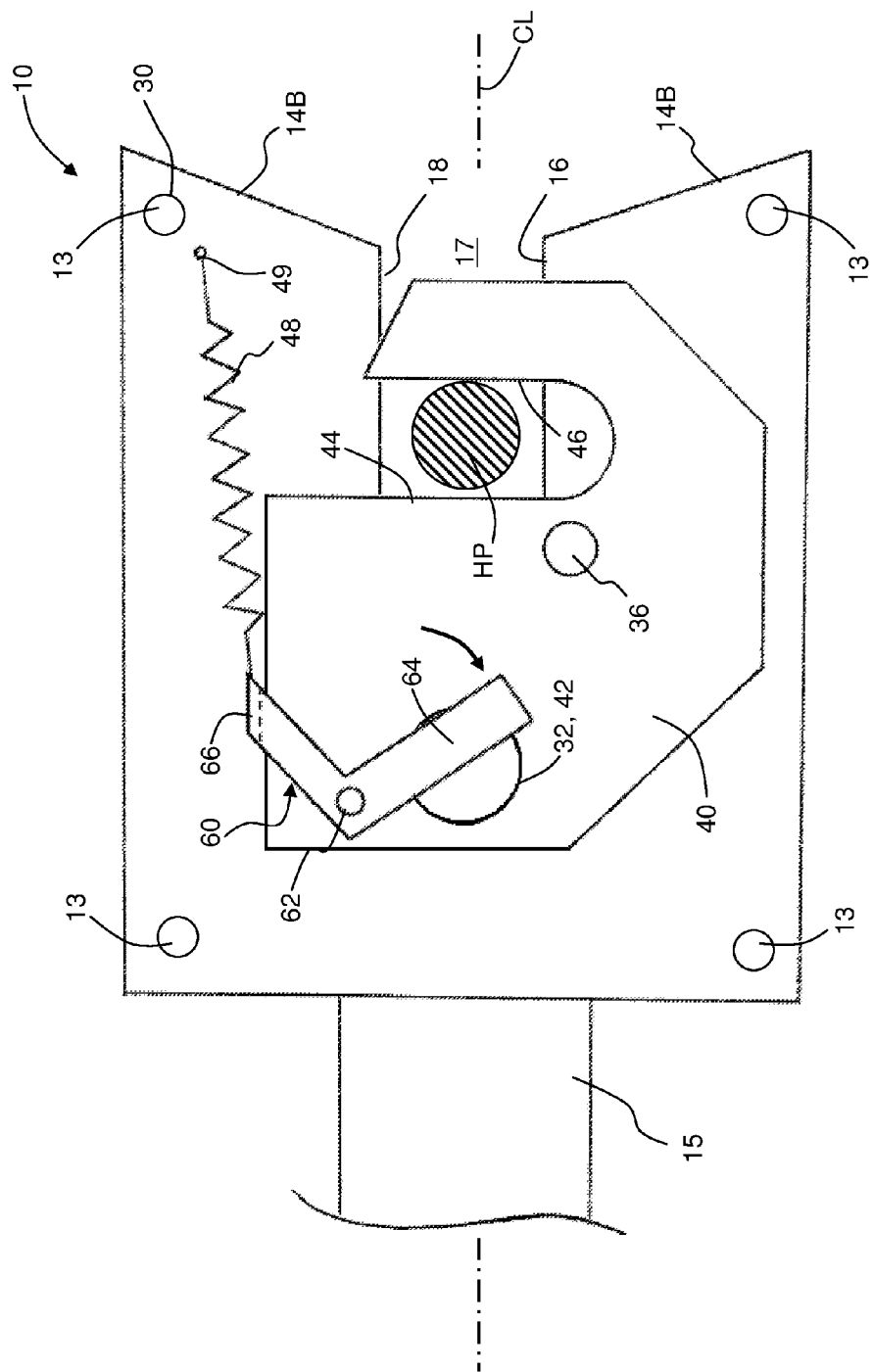
FIG. 7 is a top view of the hitch assembly illustrated in the closed and unlocked position as shown in FIG. 4 with the upper body member removed.
Figure 8:
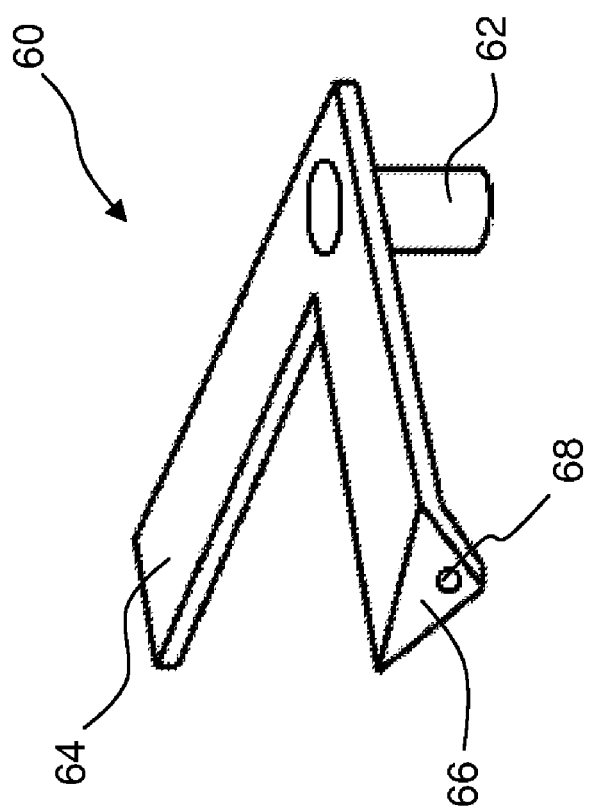
FIG. 8 is a perspective view of an unlocking member in accordance with this invention.

Referring now to FIGS. 5 through 7, top views of the hitch assembly 10 are provided. As briefly discussed above, the latch member 40 may be rotated between an open position (shown in FIG. 5) and a closed position (shown in FIGS. 6 and 7). In the illustrated embodiments, the latch member 40 is mounted for rotation about the pivot pin 36. The pivot pin 36 is laterally spaced or otherwise offset from the centerline CL of the slot 17. As a result of the offset, a rotational moment is applied to the latch member 40 by the hitch pin HP when the hitch pin HP is received within or otherwise removed from the slot 17. Alternatively, it should be appreciated that the latch member 40 may be mounted for linear movement as opposed to rotational movement. For example, the latch member 40 can be configured to move in a lateral direction relative to the slot 17 if so desired.

The latch member 40 may define a cam surface 44 that is configured to pivot the latch member 40 from the open position to the closed position. As shown in FIG. 5, the cam surface 44 extends across the slot 17 when the latch member 40 is in the open position. In this position, the cam surface 44 is angled relative to the opposing surfaces 16, 18 of the slot 17. Thus, the latch member 40 is pivoted from the open position to the closed position when the hitch pin HP engages the cam surface 44.

The latch member 40 may also define a contact surface 46 that is configured to engage and secure the hitch pin HP within the slot 17. As shown in FIGS. 6 and 7, the contact surface 46 extends across the slot 17 when the latch member 40 is in the closed position. In this position, the contact surface 46 is substantially perpendicular to the opposing surfaces 16, 18 of the slot 17 but may alternatively be positioned at any desired angle. Thus, the latch member 40 is configured to secure the hitch pin HP within the slot 17 when in the closed and locked position, as will be further explained below.

A second biasing element 48 is attached at a first end to the housing 12 by a roll pin 49 and at a second end to the unlocking member 60. Thus, the second biasing element 48 is configured to pivotally bias the extending portion 64 of the unlocking member 60 over the aperture 42 and also to pivotally bias the latch member 40 in the open position. In the illustrated embodiment, the second biasing element 48 is an extension spring, although any biasing component may be incorporated if so desired. Alternatively, the unlocking member 60 and the latch member 40 may be separately biased as described above by individual biasing elements. For example, the second biasing element 48 may be embodied as circular springs or the like separately mounted about the pivot pin 36 of the latch member 40 and the mounting pin 62 of the unlocking member 60.

As illustrated, the aperture 42 of the latch member 40 and the apertures 22, 32 of the first and second members 20, 30 are located the same distance from the pivot pin 36. Thus, when the latch member 40 is in the open position (shown in FIG. 5) the aperture 42 is misaligned from the apertures 22, 32. However, when the latch member 40 is in the closed position (shown in FIGS. 6 and 7) the aperture 42 is in axial alignment with the apertures 22, 32. The aperture 42 and the apertures 22, 32 can be located any distance from the pivot pin 36 for a desired application.

Operation of the hitch assembly 10 will now be described in further detail with reference to FIGS. 2 through 7. Initially, the hitch assembly 10 can be mounted to any portion of the towing vehicle, such as for example to a rear hitch or draw bar, using the mounting section 15 as described above. Thus, the hitch assembly 10 may then be used to automatically engage and disengage the towing vehicle with the towed vehicle.

Referring now to FIGS. 2 and 5, the hitch assembly 10 is illustrated in the open position. In this position, the latch member 40 is biased such that the cam surface 44 is configured to extend across the slot 17 and receive the hitch pin HP within the hitch assembly 10. Further, the locking pin 56 is biased for engagement with the top surface of the latch member 40. The extending portion 64 of the unlocking member 60 is also biased is the extended position over the aperture 42.

As the hitch pin HP is received within the slot 17, it contacts the cam surface 44 of the latch member 40. The force of the hitch pin HP creates a rotational moment on the latch member 40 that exceeds the rotational moment exerted by the second biasing element 48. This causes the latch member 40 to rotate about the pivot pin 36 from the open position to the closed position. As the latch member 40 begins to rotate to the closed position, the aperture 42 pivots toward the apertures 22, 32 of the first and second members 20, 30. This movement brings the extending portion 64 of the unlocking member 60 into contact with an outer surface of the locking pin 56. As the latch member 40 is further rotated to the closed position, the locking pin 56 pivots the unlocking member 60 away from the aperture 42 to the retracted position.

Referring now to FIGS. 3 and 6, the hitch assembly 10 is illustrated in the closed and locked position. As shown, when the latch member 40 is fully rotated to the closed position the aperture 42 of the latch member 40 becomes axially aligned with the apertures 22, 32. The extending portion 64 of the unlocking member 60 is pivoted to the retracted position by the locking pin 56. This configuration allows the locking pin 56 to be automatically inserted into the aligned apertures (shown in FIG. 3). In the closed and locked position, the locking pin 56 prevents rotation of the latch member 40. As a result, the contact surface 46 of the latch member 40 engages the hitch pin HP within the slot 17 and the towed vehicle is connected to the towing vehicle.

Referring now to FIGS. 4 and 7, the hitch assembly 10 is illustrated in the closed and unlocked position. As described above, the locking pin 56 may be released from the locked position by applying a pulling force on the release handle 54. The pulling force withdraws the locking pin 56 in an upward direction within the enclosure 52. The release handle 54 is pulled until the locking pin 56 fully clears the extending portion 64 of the unlocking member 60 (i.e. when the extending portion 64 is no longer in contact with locking pin 56). The unlocking member 60 then pivots back to the extended position over the aperture 42 by the second spring member 48. When the release handle 54 is thereafter released, the locking pin 56 moves slightly in the biased or downward direction and comes to rest on a top surface of the extending portion 64 of the unlocking member 60. Once the locking pin 56 is disengaged from the latch member 40, the hitch pin HP can be disengaged from the hitch assembly 10 by movement of the towing vehicle.

As the hitch pin HP is disengaged from the hitch assembly 10, the latch member 40 automatically rotates from the closed position back to the biased open position. Thus, the aperture 42 is no longer in alignment with the apertures 22, 32 and the locking pin 56. The locking pin 56 then moves slightly in the biased or downward direction back into engagement with the top surface of the latch member 40. The hitch assembly 10 is now configured to automatically receive and engage another hitch pin HP.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A hitch assembly comprising:
   a body;
   a latch member that is movable relative to the body between a closed position, wherein the latch member and the body are adapted to secure a hitch pin to the body, and an opened position, wherein the latch member and the body are not adapted to secure a hitch pin to the body;
   a locking pin that is movable between an engaged position, wherein the locking pin retains the latch member in the closed position relative to the body, and a disengaged position, wherein the locking pin does not retain the latch member in the closed position relative to the body; and
   an unlocking member that is mounted directly to the latch member for movement relative thereto, the unlocking member being movable between an extended position, wherein the unlocking member prevents the locking pin from moving from the disengaged position to the engaged position, and a retracted position, wherein the unlocking member does not prevent the locking pin from moving from the disengaged position to the engaged position.

2. The hitch assembly of claim 1, wherein the latch member is biased in the open position.

3. The hitch assembly of claim 1, wherein the latch member defines an aperture that is configured to receive the locking pin in the engaged position.

4. The hitch assembly of claim 3, wherein the aperture is misaligned with the locking pin when the latch member is in the open position and is aligned with the locking pin when the latch member is in the closed position.

5. The hitch assembly of claim 1, wherein the unlocking member is biased in the extended position.

6. The hitch assembly of claim 5, wherein the locking pin is configured to move the unlocking member from the extended position to the retracted position when the latch member is moved from the open position to the closed position.

7. The hitch assembly of claim 1, wherein the unlocking member is mounted for pivotal movement to the latch member.

8. The hitch assembly of claim 1, wherein the unlocking member defines a flat portion that is configured to prevent the locking pin from engage the latch member.

9. The hitch assembly of claim 1, wherein the unlocking member includes a tab that is adapted to limit movement of the unlocking member.

10. The hitch assembly of claim 1, further including a biasing component that is adapted to bias the latch member in the open position and the unlocking member in the extended position.

11. A hitch assembly comprising:
    a body;
    a latch member mounted to the body for movement between an open position and a closed position;
    a locking pin mounted to the body for movement relative to the latch member, wherein the locking pin is adapted to engage and lock the latch member in the closed position; and
    an unlocking member mounted to the latch member for movement relative to the locking pin, wherein the unlocking member is adapted to prevent the locking pin from engaging and locking the latch member in the closed position after the locking pin has been disengaged from the latch member.

12. The hitch assembly of claim 11, wherein the latch member is biased in the open position.

13. The hitch assembly of claim 11, wherein the latch member defines an aperture that is configured to receive the locking pin for locking the latch member in the closed position.

14. The hitch assembly of claim 13, wherein the aperture is misaligned with the locking pin when the latch member is in the open position and is aligned with the locking pin when the latch member is in the closed position.

15. The hitch assembly of claim 11, wherein the unlocking member is biased in a position to prevent the locking pin from engaging and locking the latch member in the closed position.

16. The hitch assembly of claim 11, wherein the locking pin is configured to move the unlocking member when the latch member is moved from the open position to the closed position.

17. The hitch assembly of claim 11, wherein the unlocking member is mounted for pivotal movement to the latch member.

18. The hitch assembly of claim 11, wherein the unlocking member defines a flat portion that is configured to prevent the locking pin from engaging and locking the latch member in the closed position.

19. The hitch assembly of claim 11, wherein the unlocking member includes a tab that is adapted to limit movement of the unlocking member.

20. The hitch assembly of claim 11, further including a biasing component that is adapted to bias the latch member in the open position and the unlocking member in the extended position.

\* \* \* \* \*